US005212887A

United States Patent [19]

Farmerie

[11] Patent Number: 5,212,887

[45] Date of Patent: May 25, 1993

[54] COUNTERBALANCED ORBITAL DRIVE MECHANISM FOR SAWS AND THE LIKE

[75] Inventor: Joseph G. Farmerie, Muskego, Wis.

[73] Assignee: S-B Power Tool Company, Chicago, Ill.

[21] Appl. No.: 853,108

[22] Filed: Mar. 18, 1992

[51] Int. Cl.[5] .............................................. B23D 49/10

[52] U.S. Cl. ......................................... 30/393; 30/392; 74/50

[58] Field of Search ......................... 30/392, 393, 394; 74/50

[56] References Cited

U.S. PATENT DOCUMENTS

| | | | |
|---|---|---|---|
| 1,643,721 | 9/1927 | Meyer | 30/394 |
| 1,648,008 | 11/1927 | Selby et al. | 30/394 |
| 3,729,823 | 5/1973 | Bos et al. | 30/394 |
| 3,971,132 | 7/1976 | Griffies et al. | 30/393 |
| 4,145,811 | 3/1979 | Kendzior | 30/394 |
| 4,238,884 | 12/1980 | Walton, II | 30/393 |
| 4,272,996 | 6/1981 | Sauerwein | 30/394 |
| 4,545,123 | 10/1985 | Hartmann | 30/393 |
| 4,628,605 | 12/1986 | Clowers | 30/393 |
| 4,976,164 | 12/1990 | Lentino | 74/50 |
| 5,079,844 | 1/1992 | Palm | 74/50 |

FOREIGN PATENT DOCUMENTS

| | | | |
|---|---|---|---|
| 2805012 | 8/1979 | Fed. Rep. of Germany | 30/394 |

*Primary Examiner*—Douglas D. Watts
*Assistant Examiner*—Hwei-Siu Payer
*Attorney, Agent, or Firm*—Jones, Day, Reavis & Pogue

[57] ABSTRACT

A drive gear is mounted for rotation in a plane parallel with the axis of rotation of the output member of the motor. The gear includes an annular series of beveled gear teeth in meshing engagement with beveled pinion teeth on the end of the motor output member. The drive gear includes a crank pin roller and an annular cam surface eccentric to the axis of rotation of the gear. The roller is received within a rectilinear slot in the plunger assembly thereby defining a scotch-yoke drive for reciprocating the plunger assembly. The plunger assembly includes planar cam follower formations engaged by the annular cam surface to provide an oscillating component of movement to the plunger assembly. The crank pin mounts a disk in eccentric relationship to the drive gear; this disk supports another crank pin and roller. A counterweight having a mass substantially the same as the plunger assembly has a rectilinear slot receiving the last-mentioned roller thereby constituting a second scotch-yoke drive for reciprocating the counterweight. The counterweight includes planar cam follower surfaces engaged with peripheral portions of the disk thereby imparting an oscillatory component to movement of the counterweight.

17 Claims, 4 Drawing Sheets

66
94
64
84
88
92
86
90
82
118
106
3
3
42
72
48
34
12
30
22
18
14
10
15
120
44

106
114
108
108a
110
112
102
104
98
96
100
66
68
64
60
62
74
72
76
70
76a
78
80
54
50
52
48
56

COUNTERBALANCED ORBITAL DRIVE MECHANISM FOR SAWS AND THE LIKE

BACKGROUND OF THE INVENTION

The present invention relates to drive mechanisms for imparting orbital movement to saw blades or the like. In particular, the present invention relates to such an orbital drive mechanism having a counterbalancing member to minimize vibration.

As is known to those skilled in the art of power tool design, it is desirable to provide reciprocating saws with an orbital movement to facilitate the cutting of materials, such as wood. Power tools of the type under consideration are referred to as recipro saws or jigsaws. As is also known to those skilled in the art, it is desirable to provide these power saws with a counterbalancing mechanism to minimize vibration.

Representative prior art is shown by U.S. Pat. Nos.: Bauer 3,890,708; Brookfield 3,945,120; Grossmann, et al. 4,798,001; Martinez, et al. 5,009,012; Palm 5,025,562; and UK patent application 2 181 693.

SUMMARY OF THE INVENTION

The present invention provides a new and improved orbital drive mechanism for a power operated reciprocating saw or the like.

Another object of the present invention is the provision of an orbital drive mechanism for a power operated reciprocal saw or the like which minimizes vibration to the maximum extent by the use of an oscillatory counterweight mechanism.

Still another object of the present invention is the provision of a drive mechanism of the type described which lends itself to compact construction by having the plunger assembly and the counterweight move in planes parallel with the plane of rotation of the drive gear.

These and other objects and advantages of the invention will become apparent from the following specification disclosing a preferred embodiment.

DESCRIPTION OF THE INVENTION

Figure 1:
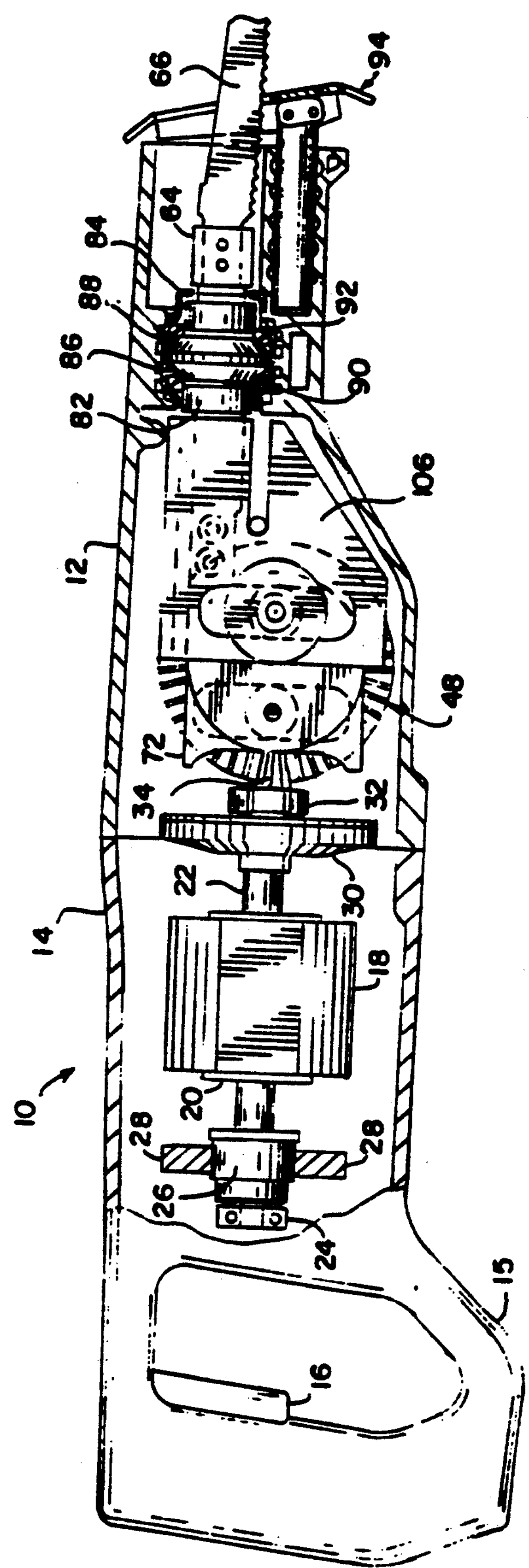
FIG. 1 a side elevational view of a power tool embodying the present invention with a portion of the tool casing and other parts being broken away for better illustration of the orbital drive mechanism.

Referring to the drawings, a power operated, reciprocating saw, sometimes referred to in the trade as a recipro saw, is generally designated 10. It will be understood that the present invention has applicability to other types of power tools having orbiting reciprocating cutting members, such as a jigsaw.

Figure 4:
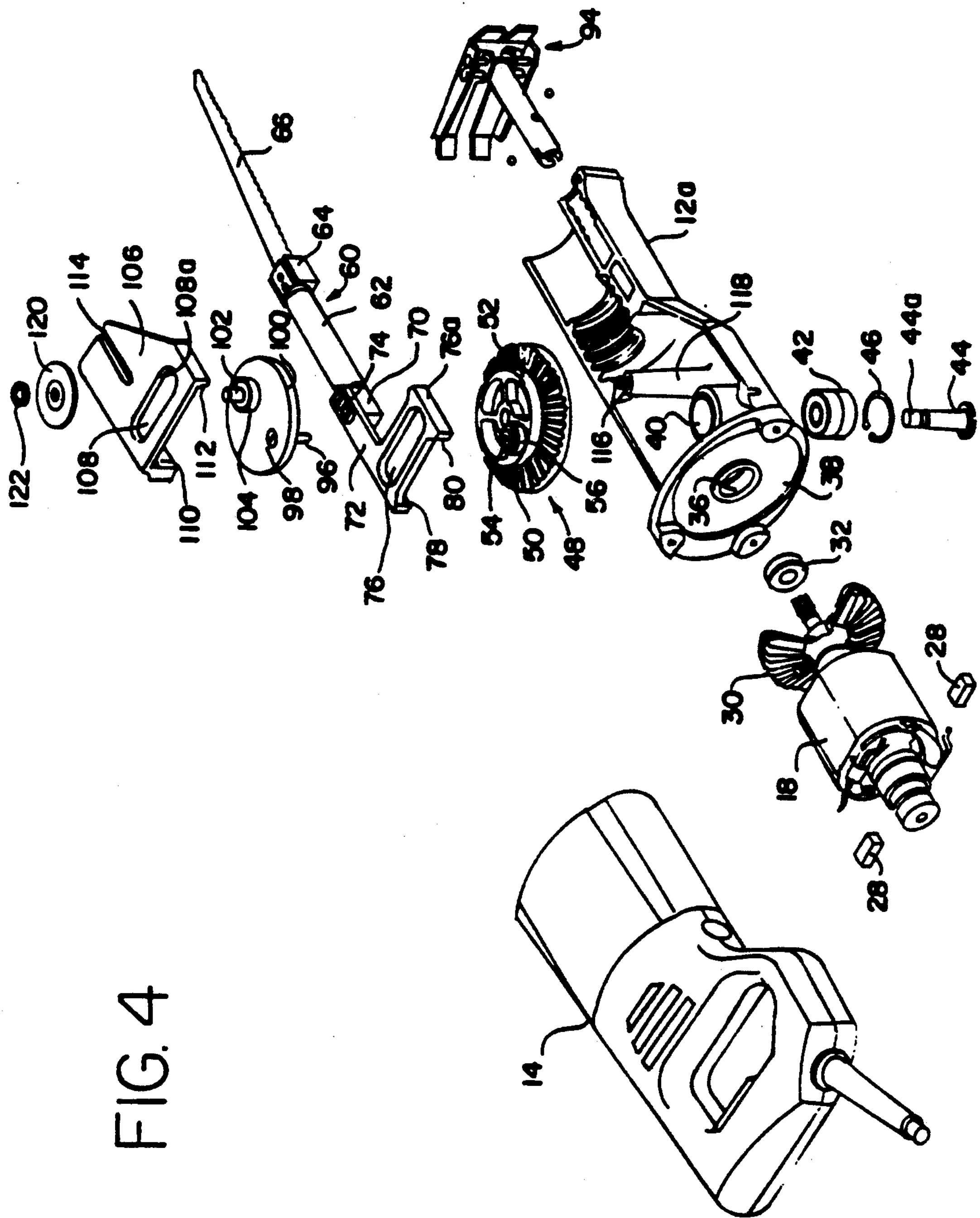
FIG. 4 is an exploded isometric view showing a part of the tool casing and the principal components of the orbital drive mechanism.

The power tool includes casing sections 12 and 14. The casing section 12 is preferably made in two parts, including the part 12*a* as shown in FIG. 4. The casing section 14 includes a handle portion 15 mounting an operating trigger 16. The casing section 14 is generally hollow and receives an electric motor, such as a series or universal motor, including a stator 18 and an armature 20. The armature includes an armature or output shaft 22, one end of which is suitably mounted in a bearing assembly 24 supported by the casing 14. The armature shaft 22 includes a commutator 26 engaged by a pair of brushes 28. It will be understood that the drive mechanism of the present invention may be operated by other types of electric motors or even other types of motors, such as a pneumatic motor, for example.

The output shaft 22 has the usual cooling fan 30 mounted thereon. The other or forward end of the output shaft 22 is supported by an annular bearing assembly 32, the latter being suitably mounted in the casing section 12*a*. A set of beveled pinion teeth 34 is formed on the forward end of the output shaft 22.

Referring now particularly to FIG. 4, it will be seen that the bearing 32 is received within annular opening 36 formed in a wall 38, the latter being integral with the housing part 12*a*. This same housing part includes an integral annular formation 40 which receives a dual ball bearing assembly 42. The dual ball bearing assembly 42 rotatably supports a shaft 44, the latter being suitably mounted in cantilever fashion in the formation 40 by a C-ring 46. The end 44*a* of the shaft 44 is suitably connected to a gear member, generally designated 48, for supporting the latter for rotation about the axis of the shaft 44.

The gear member 48 includes an annular series of beveled teeth 50; these teeth mesh with the teeth 34 on the end of the motor output shaft 22. Thus, it is apparent that the gear member 48 is driven or rotated by the motor 18.

The gear member 48 has an annular formation 52 suitably secured thereto. It is important to understand that this circular formation is eccentric with respect to the axis of rotation of the gear member 48. Further, the gear member 48 includes a pin 54 which may be characterized as a crank pin as it is eccentric with respect to the axis of rotation of the gear. The pin 54 rotatably supports a roller 56 through a suitable bearing arrangement.

A plunger assembly is generally designated 60. This assembly includes a plunger 62 having a bracket assembly 64 at one end thereof for detachably mounting a saw blade 66 by means of fasteners 68. The other end of the plunger 62 is suitably connected to a blocklike member 70 which is connected to a plate 72 by means of fasteners 74. The plate 72 includes a rectilinear slot 76 defining opposed planar sidewalls 76*a*. It will be seen that the eccentrically mounted roller 56 is received within the slot 76 with diametrically opposed portions of the roller 56 respectively engaging portions of the planar surfaces 76*a*. The roller 56 and the slot 76 constitute, in essence, a scotch yoke assembly for imparting reciprocal movement to the plunger assembly upon rotation of the gear 48.

It will also be noted that the plate 72 includes opposed planar cam follower surfaces 78 and 80. These planar surfaces are engaged by the annular wall 52 at diametrically oppositely disposed portions on the latter. Since the annular formation 52 is eccentric with respect to the axis of rotation of the gear 48, it is apparent that oscillatory movement will be imparted to the plunger assembly 60 upon rotation of the gear 48 thereby to move the distal end portion of the blade 66 in an orbital path. This movement is orbital in nature because of the dual cam action imparted to the plunger assembly.

Figures 2, 3:
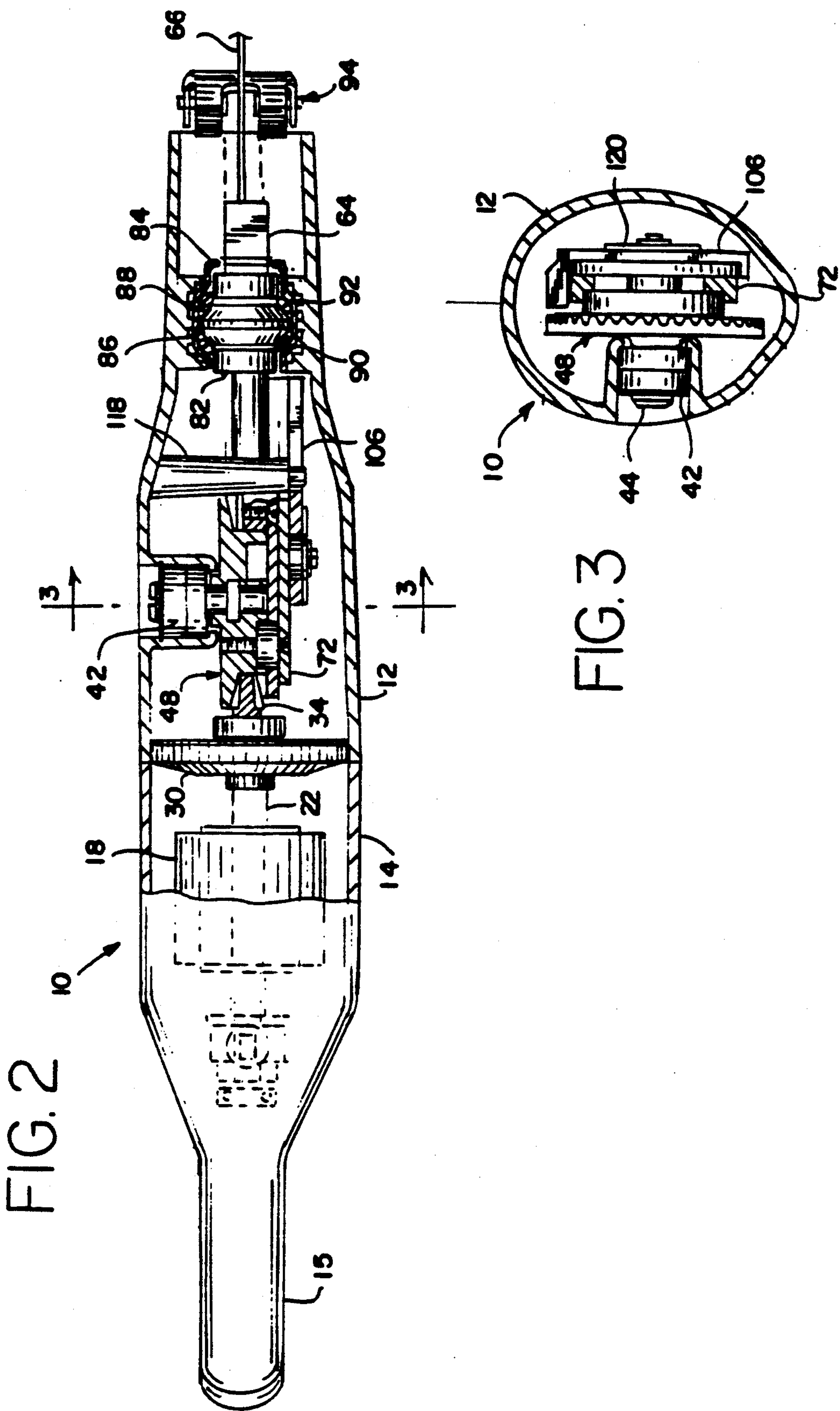
FIG. 2 is a top plan view of the tool shown in FIG. 1.
FIG. 3 is a section taken along the line 3—3 of FIG. 2.

Referring particularly to FIGS. 1 and 2, it will be seen that the plunger 62 is slidably received within an annular bearing member, generally designated 82. The bearing 82 is received within an annular support 84 (FIG. 1) which is suitably mounted within the tool casing 12. It will be noted that the bearing 82 has frustoconical formations 86 and 88 which cooperate with the inner surfaces of the bracket 84 to define spaces for receiving 0-rings 90 and 92. These 0-rings and the clearance spaces between the bearing 82 and the inside surfaces of the bracket 84 cooperate to provide a swivel or swinging mounting for the plunger assembly thereby to permit the oscillatory movement of the latter as referred to above. It will be seen that the bearing 82 cooperates with the planar surfaces 78 and 80 to mount the plunger assembly 60 for oscillating movement in the tool casing.

It should be mentioned in passing that the power tool 10 includes and adjustable foot plate, generally designated 94. This adjustable foot plate forms no part of the present invention and thus requires no further description herein.

Figure 5:
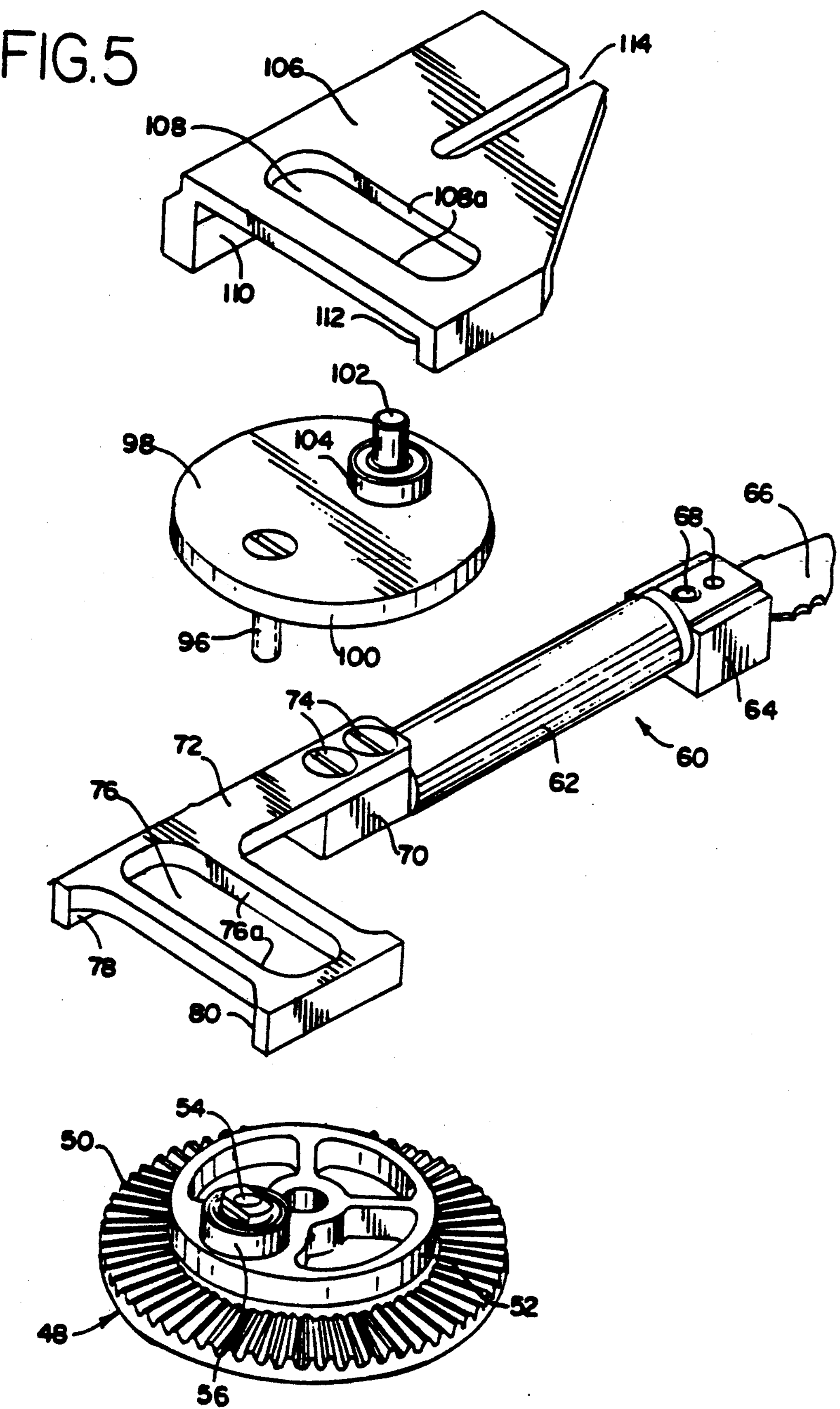
FIG. 5 is an enlarged exploded isometric view showing the principal parts of the orbital drive mechanism.

Referring now to FIG. 5 in particular, the eccentric crank pin 54 is adapted for threading engagement with a fastener 96. The fastened 96 is connected to a disk 98 and serves to mount the latter on the gear 48 for rotation with the latter. The disk 98 defines an annular peripheral formation 100; it is important to understand that this circular formation is eccentric with respect to the axis of rotation of the gear 48. The disk 98 supports an eccentric crank pin 102 which in turn mounts a roller 104 through a suitable bearing assembly. Before describing the primary functions of the disk 98, it should be pointed out that the disk 98 holds the plunger assembly plate 72 into engagement with the annular formation 52 and the roller 56 on the gear 48.

The present invention includes a counterweight member 106 which has a mass substantially the same as the mass of the plunger assembly 60. The counterweight has a planar portion with a slot 108 defining opposed parallel planar formations 108*a*. It will be understood that the roller 104 is received within the slot 108 with diametrically opposed portions of the former in engagement with corresponding portions of the planar cam follower formations 108*a*. Thus, the roller 104 and slot 108 constitute, in effect, another scotch yoke mechanism for imparting reciprocal movement to counterweight 106 upon rotation of the gear 48.

The counterweight 106 also includes opposed parallel planar surfaces 110, 112. These planar surfaces engage the annular peripheral formation 100 of the disk 98 at diametrically opposed locations on the latter. Since the disk 98 is eccentric with respect to the axis of rotation of the gear 48, it is apparent that the disk 98 will cooperate with the scotch yoke assembly to impart oscillatory movement to the counterweight 106 upon rotation of the gear 48.

The counterweight 106 includes a further slot 114 which receives a stationary pin 116 mounted on a pedestal formation 118, the latter forming part of the casing part 12*a*. Thus, the slot 114 cooperates with the planar formations 108*a*, 110 and 112 for supporting the counterweight 106 for oscillatory movement. The counterweight is further held in place by a washer 120 having a diameter greater than the width of the slot 108. The washer is held in place by a retaining ring 122, the latter being suitably connected to the distal end of the crank pin 102. Thus, the slot 114 and pin 116 cooperate with the planar surfaces 110, 112 to mount the counterweight for oscillating movement in the tool casing. It will be apparent that this movement is essentially orbital in nature in view of the dual cam action imparted to the counterweight.

It will be noted that the crank pins 54 and 102 are in 180 degree relationship with each other. It will also be understood that the radial distance between the axis of rotation of the gear 48 and the axis of the pin 54 is the same as the distance between the axis of rotation of the gear 48 and the axis of the pin 102. Thus, when the scotch yoke constituted by the roller 56 and slot 76 serves to move the plunger assembly 60 in one direction the other scotch yoke constituted by the roller 104 and slot 108 will move the counterweight 106 in an opposite direction. Similarly, the eccentric axes of the annular formation 52 and the annular formation 100 are in 180 degree relationship with each other. Further, the distance between the axis of rotation of the gear member 48 and the central axis of the formation 52 is the same as the distance between the axis of rotation of the gear 48 and the central axis of the annular formation 100. Accordingly, when the annular formation 52 serves to move the plunger assembly 60 in one direction, the annular formation 100 serves to move the counterweight in the opposite direction. It will also be understood that the various parts are designed so that the distance between the center of mass of the plunger assembly 60 and the center of mass of the counterweight 106 are at a minimum. Hence, in accordance with the present invention, vibration is reduced to a maximum extent.

It will also be appreciated that the present invention lends itself to very compact construction which is of great importance in the design of a portable power tool. This is achieved by having all principal parts of the drive mechanism sandwiched in close relationship and mounted for movement in planes parallel with the plane of rotation of the gear 48.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A power tool for imparting orbital movement to a saw blade comprising:

(a) a casing;

(b) a motor mounted within said casing;

(c) a plunger assembly swingably supported by said casing for mounting a saw blade having a working; and (d) a drive mechanism contained within said casing and connected to said motor and said plunger assembly for imparting oscillatory movement to the latter and including:

(1) first compound cam means including first and second cam elements connected to said plunger assembly for imparting oscillatory movement to the latter thereby to move the working end of the saw blade in an orbital path;

(2) a counterweight having a mass substantially the same as the mass of the plunger assembly; and (3) second compound cam means including third and fourth cam elements connected to said counterweight for imparting orbital movement to at least a portion of the latter such that the counterweight develops forces to counterbalance movement of the plunger assembly.

2. A power tool for imparting orbital movement to a saw blade comprising:
(a) a casing;
(b) a motor mounted within said casing including a rotary output member;
(c) a plunger assembly swingably supported by said casing for mounting a saw blade; and
(d) a drive mechanism contained within said casing and connected to said motor and said plunger assembly for imparting oscillatory movement to the latter and including:
(1) a gear driven by said rotary output member.
(2) first compound cam means including first and second cam elements mounted on said gear;
(3) said plunger assembly including first and second cam following surfaces in respective engagement with said first and second cam elements such that rotation of such gear imparts orbital movement to at least a portion of said plunger assembly;
(4) second compound cam means mounted on said gear;
(5) a counterweight having a mass substantially the same as the mass of the plunger assembly and mounted for movement independently of the plunger assembly; and
(6) said counterweight including cam following means in engagement with said second compound cam means whereby at least a portion of said counterweight is actuated to move in an orbital path upon rotation of said gear.

3. The power tool according to claim 2 further defined by:
(a) said second compound cam means including third and fourth cam elements mounted on said gear; and
(b) said counterweight including third and fourth cam following surfaces in engagement with said third and fourth cam elements, respectively, such that orbital movement is imparted to at least a portion of said counterweight to counterbalance movement of the plunger assembly.

4. The power tool according to claim 2 further defined by:
(a) said gear being mounted for rotation in a first plane; and
(b) said plunger and said counterweight being mounted for movement in respective second and third planes each parallel with said first plane.

5. The power tool according to claim 4 wherein said gear is a beveled gear contained in a plane parallel with the axis of rotation of said rotary output member.

6. A power tool for imparting orbital movement to a saw blade comprising:
(a) a casing;
(b) a motor mounted in said casing and having a rotary output member;
(c) a plunger assembly swingably supported by said casing for mounting a saw blade; and
(d) a drive mechanism contained within said casing and connected to said motor and said plunger assembly for imparting oscillatory movement to the latter and including:
(1) a gear mounted for rotation and means for rotating the former upon rotation of the latter;
(2) first and second different annular cam formations mounted on said gear and each being eccentric with respect to the axis of rotation of the gear;
(3) first and second sets of opposed cam follower formations forming part of said plunger assembly with the first set of cam follower formations being engaged by said first annular cam formation at diametrically opposed locations on the latter and with the second set of cam follower formations being engaged by said second annular cam formation at diametrically opposed locations on the latter;
(4) third and fourth different annular cam formations mounted on said gear and each being eccentric with respect to the axis of rotation of the gear;
(5) a counterweight member;
(6) third and fourth sets of opposed cam follower formations formed on said counterweight member with the third set of cam follower formations being engaged by said third annular cam formation at diametrically opposite locations on the latter and with the fourth set of cam follower formations being engaged by said fourth annular cam formation at diametrically opposed locations on the latter;
(7) first mounting means including at least said first cam follower formation mounting said plunger assembly for orbital movement in a plane parallel with the plane of rotation of said gear; and
(8) second mounting means including at least said third cam follower formation mounting said counterweight for orbital movement in a plane parallel with the plane of rotation of said gear.

7. The power tool according to claim 6 wherein the axis of rotation of the rotary output member is parallel with the plane of rotation of said gear.

8. The power tool according to claim 6 wherein the mass of said counterweight member is substantially the same as the mass of the plunger assembly.

9. The power tool according to claim 8 wherein the axis of rotation of the rotary output member is parallel with the plane of rotation of said gear.

10. The power tool according to claim 8 wherein said second and fourth cam formations and the respective second and fourth cam follower formations constitute separate scotch yoke assemblies.

11. The power tool according to claim 10 wherein the axis of rotation of the rotary output member is parallel with the plane of rotation of said gear.

12. The power tool according to claim 10 wherein said first and third cam follower formations are in parallel relationship with each other and wherein said second and fourth cam follower formations are in parallel relationship with each other and in 90 degrees relationship with the first and third cam follower formations.

13. The power tool according to claim 12 wherein the axis of rotation of the rotary output member is parallel with the plane of rotation of said gear.

14. A power tool for imparting orbital movement to a saw blade comprising:
(a) a casing;
(b) a motor mounted within said casing and having a rotary output member with beveled gear teeth formed on the distal end thereof;
(c) a plunger assembly supported by said casing for mounting a saw blade; and (d) a drive mechanism contained within said casing and connected to said motor and said plunger assembly for imparting orbital movement to the saw blade and including:

(1) a gear mounted for rotation in a plane parallel with the axis of rotation of said output member, said gear being provided with an annular set of beveled gear teeth arranged for meshing engagement with said beveled gear teeth on said output member, said gear also including an annular formation for rotation about the axis of rotation of the gear in eccentric relationship therewith, said gear further including an eccentrically mounted pin supporting a first roller;

(2) said plunger assembly including a member defining a first slot receiving said first roller and extending generally perpendicular to the longitudinal axis of the plunger assembly such that generally reciprocal movement is imparted to the plunger assembly upon rotation of said gear, said plunger assembly also including opposed planar formations engaging said annual formation at diametrically opposed locations on the latter and extending generally perpendicular to said first slot for imparting orbital movement to said plunger assembly upon rotation of said gear;

(3) a fastener engaged with said pin and supporting a disk member in parallel spaced relationship with said gear, the periphery of said disk defining a further annular formation eccentric with respect to the axis of rotation of said gear, said disk supporting an eccentrically mounted pin in substantially 180 degree relationship with the first-mentioned pin and which in turn mounts a second roller; and (4) a counterweight having a planar portion mounted for movement in a plane parallel with the plane of rotation of said gear, said planar portion defining a second slot parallel with said first slot and receiving said second roller such that rotation of said disk in unison with said gear imparts generally reciprocal movement to said counterweight, said counterweight also defining parallel opposed planar surfaces engaged with the periphery of said disk at diametrically oppositely disposed locations on the latter and extending generally perpendicular to said second slot such that rotation of said disk in unison with said gear imparts an orbital movement to said counterweight.

15. The power tool according to claim 14 wherein said casing includes a swivel bearing which cooperates with said first mentioned opposed planar surfaces for supporting said plunger assembly for orbital movement.

16. The power tool according to claim 14 further defined by:

(a) said planar portion of said counterweight defining another slot extending generally perpendicular to said second slot; and (b) a stationary pin mounted by said casing with a portion thereof received within said another slot thereby to aid in mounting said counterweight for orbital movement.

17. The power tool according to claim 16 wherein said casing includes a swivel bearing which cooperates with said first mentioned planar surfaces for supporting said plunger assembly for orbital movement.

* * * * *